June 11, 1968 R. WICK ETAL 3,387,533
APPARATUS FOR OPTICAL COPYING OF PHOTOGRAPHIC NEGATIVES
Filed Sept. 21, 1965 3 Sheets-Sheet 1

INVENTOR.
RICHARD WICK
AMBROS ZELLER
HANS-ADO BRANDT
BY
Michael J. Striker
ATTY

June 11, 1968  R. WICK ET AL  3,387,533
APPARATUS FOR OPTICAL COPYING OF PHOTOGRAPHIC NEGATIVES
Filed Sept. 21, 1965  3 Sheets-Sheet 2
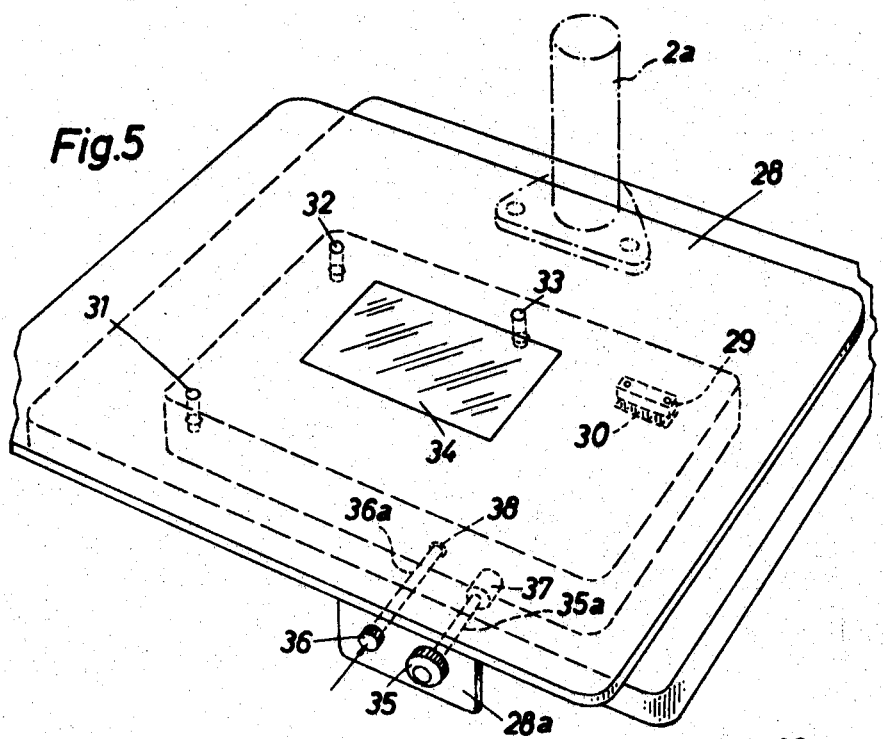
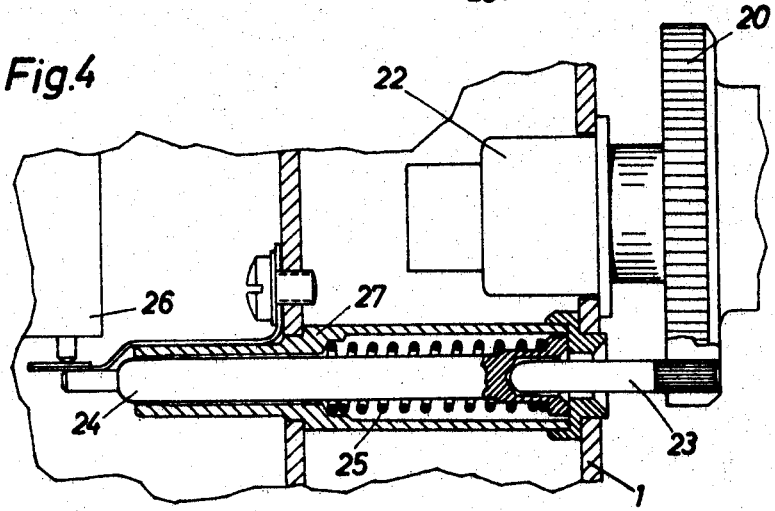
INVENTOR.
RICHARD WICK
AMBROS ZELLER
HANS-ADO BRANDT
BY Michael J. Striker
Attorney

United States Patent Office 3,387,533
Patented June 11, 1968

3,387,533
APPARATUS FOR OPTICAL COPYING OF PHOTOGRAPHIC NEGATIVES
Richard Wick, Grunwald, near Munich, and Ambros Zeller and Hans-Ado Brandt, Munich, Germany, assignors to Agfa-Gevaert Aktiengesellschaft, Leverkusen, Germany
Filed Sept. 21, 1965, Ser. No. 489,032
Claims priority, application Germany, Sept. 25, 1964,
A 47,164
18 Claims. (Cl. 88—24)

ABSTRACT OF THE DISCLOSURE

Apparatus for optical copying and enlarging of photographic negatives includes a support (2) which constitutes the top panel of a casing (1) and comprises a light permeable window (3) which admits light through a sheet of light sensitive paper on the support and into the interior of the casing. An image frame (14) on the support comprises shiftable masks (17, 18) which determine the size of the projected image of a negative on the paper. Two potentiometers (15, 16) counterbalance the effects due to changes in quantity of light passing through the paper in response to shifting of the masks. The image frame is releasably secured to the casing by means of fasteners (11, 12, 13) so that it can be removed to render a larger portion of the support available for placing the paper thereon.

---

The present invention relates to an apparatus for optical copying and enlarging of photographic negatives.

In heretofore known optical copying and enlarging apparatus, the size of a copy is determined by the range of adjustment of shiftable masks which define the area or size of the image of the projected negative on copying paper. Such range of adjustment normally depends on the area of the light permeable portion of the top plate or support on the casing which forms the lowermost part or base of the copying apparatus. The copying paper is placed onto the support so that it overlies the light permeable portion.

It is also known to provide the apparatus with an attachment which can be placed on top of the support of the casing and whose copying area exceeds the copying area of the support. The area of the light permeable portion in the attachment at least equals the area of the light permeable portion in the support of the casing. A serious drawback of such apparatus is that the focussing device which is used in connection with the casing must be adjusted when the attachment is mounted on top of the casing. The adjustment requires much time and skill.

Accordingly, it is an important object of the invention to provide a very simple but highly versatile optical copying and enlarging apparatus whose casing may be readily connected with or detached from different types of auxiliary units, wherein such connection or detachment of auxiliary units may be carried out by hand (i.e., without necessitating the provision of any tools which are likely to be displaced or lost), and wherein the connection or detachment of auxiliary units may be carried out with a minimum of effort and with little loss in time.

Another object of the invention is to provide the improved copying apparatus with an auxiliary unit in the form of an image frame which can be detached only when at least one of its masks is shifted to a predetermined starting position in which the adjustable potentiometers of the image frame assume positions that are properly related to the maximum image area.

A further object of the invention is to provide the apparatus with an auxiliary unit whose support can accommodate copying paper of such size which cannot be placed onto the support of the casing.

An additional object of the instant invention is to provide the apparatus with an auxiliary unit which enables the operator to manipulate the control elements on the casing by remote control so that the control elements need not be directly accessible when the auxiliary unit is placed onto the support of the casing.

Still another object of the invention is to provide a copying apparatus wherein the control circuit which regulates the exposure may be automatically adjusted by connection or disconnection of one or more resistors, depending upon whether an image frame is disconnected from or connected with the casing.

A further object of the invention is to provide an automatic switch-over device which is responsive to proper connection or disconnection of an image frame to the casing of the copying apparatus and which insures that the exposure is in proper relationship with the total area of copying paper which is exposed to light.

Another object of the invention is to provide the apparatus with a switch-over device which automatically eliminates errors such as might be due to negligence or inexperience and are likely to be commited when an auxiliary unit is being secured to or disengaged from the casing.

Briefly stated, one feature of our invention resides in the provision of an apparatus for optical copying and enlarging of photographic negatives which comprises a casing having a support or board for a sheet of light sensitive copying paper and provided with a light permeable portion which admits into the casing light that passes through the paper, an image frame placed on the support and including shiftable masks for determining the size of the image of the projected negative on the copying paper, adjustable potentiometers mechanically connected with the masks for counterbalancing the effects due to changes in the quantity of light passing through the paper on shifting of the masks, and fastener means preferably comprising manually turnable screws rotatably mounted in the image frame and extending into tapped bores provided in the support for releasably securing the image frame to the casing. When the image frame is removed, a larger area of the support is available for placing the paper thereon.

The control circuit which is provided in the casing to regulate the time of exposure of the paper may be connected with or disconnected from fixed resistor means by a switch-over device which arranged to connect the resistor means in the control circuit in response to disconnection of potentiometers or vice versa. The connection between the potentiometers and the control circuits includes a socket and a plug which latter may be provided directly on an image frame or at the free end of a cable which is connected with the potentiometers on the image frame.

The image frame may be replaced by different types of auxiliary units including an image frame without potentiometers, a relatively large support for copying paper, a strip copying device, or the like. Also, at least one such auxiliary unit may comprises remote control means for operating buttons, knobs and/or other types of movable control elements on the casing if such control elements are not accessible when the auxiliary unit is attached to the casing.

The novel features which are considered as characteristic of the invention are set forth in particular in the appended claims. The improved copying apparatus itself, however, both as to its construction and its mode of operation, together with additional features and advantages thereof, will be best understood upon perusal of the following detailed description of certain specific embodiments with reference to the accompanying drawings, in which:

FIG. 4 is an enlarged fragmentary section through the casing of FIG. 1, further showing the manner in which a plug may be connected with or disconnected from a socket on the casing;

FIG. 5 is a perspective view of the structure shown in FIG. 1, further illustrating a second support for copying paper which is detachably mounted on the casing.

Figure 1:
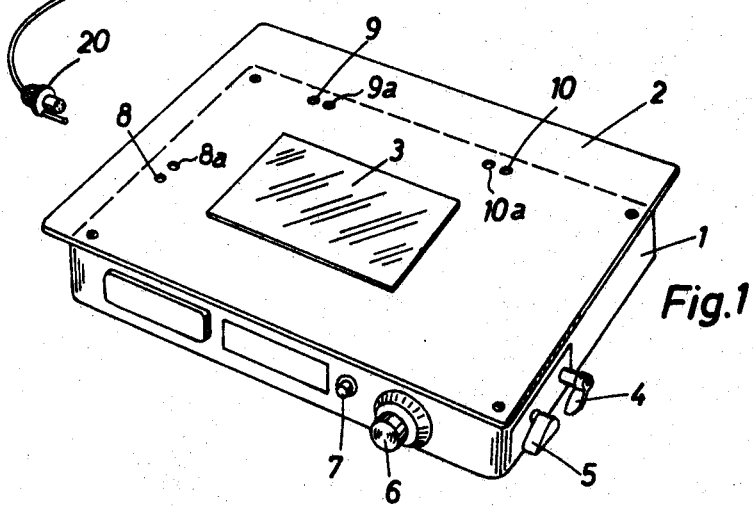
FIG. 1 is a perspective view of the casing and of the main support of the copying apparatus.

Referring first to FIG. 1, there is shown a portion of an optical copying and enlarging apparatus which comprises a relatively low casing 1 adapted to be placed onto a table or the like, not shown. The casing includes a support or base 2 for copying paper, and this support 2 extends beyond the rear and left-hand sides of the lower part of the casing 1. The median zone of the support 2 is formed with a rectangular cutout or window which is covered by a light permeable portion or pane 3. The pane 3 forms part of and may be recessed into the top face of the support 2. Its purpose is to transmit to a photoelectric cell in the interior of the casing 1 such light which has passed through the copying paper. The casing further carries a series of movable control elements including a correction handle 4, a main switch 5, a rotary adjustment knob 6, and a starter button 7.

Figure 2:
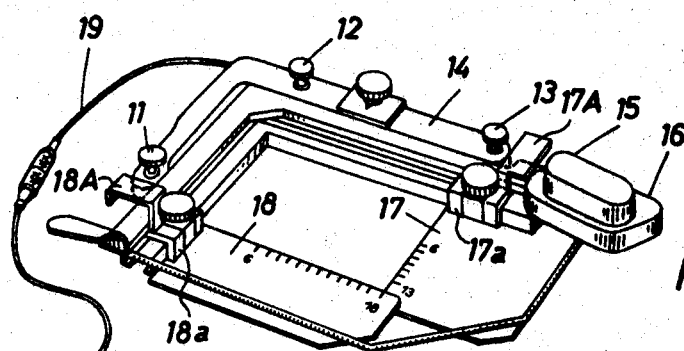
FIG. 2 is a perspective view of a first image frame which may be manually connected with or disconnected from the casing shown in FIG. 1.

The support 2 is formed with tapped bores 8, 9 and 10 which may receive threaded fasteners in the form of screws 11, 12 and 13 having knurled heads and being rotatably mounted in an auxiliary unit here shown as a first image frame 14, see FIG. 2. The image frame 14 carries two adjustable potentiometers 15, 16 whose resistance is varied automatically in response to shifting of two masks 17, 18 respectively. The manner in which the potentiometers 15, 16 are mechanically connected with and adjustable by the masks 17, 18 is disclosed, for example, in U.S. Patent No. 3,020,801 to Lander. The potentiometers 15, 16 are connected with conductors extending into a cable 19 having a plug 20 whose function will be described in connection with FIGS. 4 and 6.

The support 2 of the casing 1 is further provided with three recesses or bores 8a, 9a, 10a which may receive fasteners in the form of locating pins 31, 32, 33 shown in FIG. 5. The top face of the support is also formed with a socket 30 (see FIG. 5) which may receive a plug 29.

The manually movable shifting or actuating members 17a, 18a for the masks 17, 18 of the image frame 14 shown in FIG. 2 are connected with suitably configurated blocking devices or shields 17A, 18A respectively serving to prevent access to the fasteners 13, 11 when the masks 17, 18 are shifted from the starting positions shown in FIG. 2. This insures that, when the image frame 14 is detached from the casing 1, the potentiometers 15, 16 are invariably adjusted in such a way that their resistance is related to the total area of the pane 3. The shields 17a, 18a may be made of sheet metal or plastic and either overlie or otherwise impede access to the fasteners 13, 11 when the respective masks are shifted from their starting positions. It is clear that the shifting member 17a may carry a second shield which overlies the fastener 12 when the mask 17 is moved from its starting position.

Figure 3:
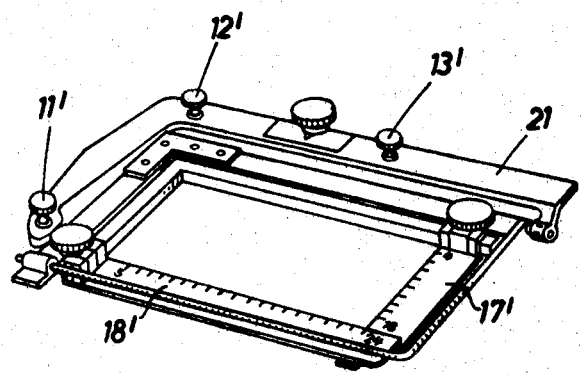
FIG. 3 is a perspective view of a second image frame which may be used interchangeably with the image frame of FIG. 2.

FIG. 3 shows a second auxiliary unit 21 which again constitutes an image frame and may be used interchangeably with the image frame 14 FIG. 2. This image frame 21 is provided with rotary fasteners 11', 12', 13' which may be screwed into the bores 8, 9, 10 in the support 2. The image frame 21 is used only for paper sizes which are greater than the dimensions of the light permeable portion or pane 3; therefore, the masks 17', 18' of the image frame 21 need not be coupled with potentiometers because they surround only a section or portion of the image. By using the image frame 21, one can obtain a high percentage of good prints as long as the ratio of the image area to total area remains above a certain minimum value.

FIG. 4 again shows the plug 20 and a socket 22 which latter is connected to the right-hand side of the casing 1, i.e., to a portion of the casing other than the support 2. The plug 20 carries a motion transmitting pin 23 forming part of a switch-over device and adapted to displace a plunger 24 when the plug is properly received in the socket 22. The plunger 24 is biased by a helical spring 25 which opposes the insertion of the pin 23, and the plunger is reciprocal in a guide cylinder 27 which is mounted in the casing 1. When the plunger 24 moves in response to insertion of the pin 23, it shifts three movable switch contacts 26a, 26b, 26c (see FIG. 6) in a switch housing 26. The housing is accommodated in the casing 1.

In FIG. 4, the plug 20 is about to be fully inserted into the socket 22 so that the position of the contacts 26a–26c in the housing 26 is still unchanged. The purpose of such contacts will be described in connection with FIG. 6; it suffices to say here that the switch housing 26 connects the conductors for the potentiometers 15, 16 with a pair of fixed resistors 41, 42 (FIG. 6) whose resistance corresponds to the maximum resistance of the potentiometers. The resistors 41, 42 are automatically disconnected by the contacts 26a–26c when the conductors leading to the socket 22 are connected with the conductors passing through the cable 19 and connecting the plug 20 with the potentiometers 15, 16, i.e., when the plug 20 is fully inserted into the socket 22. In other words, the function of the switch assembly in the housing 26 is to automatically disconnect the resistors 41, 42 when the potentiometers 15, 16 are connected in the electric control circuit of FIG. 6, or vice versa. The resistors 41, 42 are mounted in the casing 1.

When the image frame 14 is disconnected from the support 2 on the casing 1, the plug 20 is withdrawn from the socket 22 and the switch assembly in the housing 26 reassumes its normal position whereby the resistors 41, 42 are connected in the control circuit. The exposure controlling system of the apparatus is then set for operation with the maximum image size. It is of no consequence if the support 2 then carries a coyping paper whose area is the same as or smaller than the area of the support 2, as long as the area of the paper exceeds the area of the light permeble pane 3. The paper is held in position by the image frame 21 which is attached to the support 2 when the image frame 14 is detached.

FIG. 5 illustrates a third auxiliary unit which comprises a relatively large support or board 28 adapted to be used when the size of the support 2 is too small. The support 28 carries the plug 29 whose male terminals may enter the female terminals in the socket 30. The parts 29, 30 constitute a switch-over device which may be used as a substitute for the switch-over device 23–25. The locating pins 31–33 may extend into the holes 8a–10a in the support 2. The central zone of the support 28 accommodates a light permeable portion or pane 34 whose size at least equals the size of the pane 3.

In order to facilitate manipulation of the control elements 6 and 7 at the front side of the casing 1, the support 28 is provided with remote control devices 35, 36 which are mounted on a downwardly extending bracket or panel 28a and are connected with axially movable rotary spindles 35a, 36a having sleeves 37, 38 arranged to be fitted onto the control elements 6, 7 respectively. The spindles 35a, 36a can be moved axially by hand so that the operator may apply the sleeves 37, 38 over the respective control elements and may cause such control elements to turn and/or to move axially, depending upon whether the control element constitutes a depressible button or a turnable knob or handle. The control elements 4, 5 remain readily accessible even if the support 28 is secured on top of the support 2. FIG. 5 shows that a portion of the support 28 extends beyond the front edge portion of the support 2, i.e., beyond the front side of the lower part of the casing 1 so that the control elements 6 and 7 would be hard to reach by hand. The numeral 2a denotes a post of a lamphouse (not shown) which is adjustable up and down, namely, away from or toward the supports 2, 28.

The support 2 or 28 may carry other types of auxiliary units, for example, a strip copying device or the like. The strip copying device preferably comprises a switchover device which connects the resistors 41, 42 in the control circuit of FIG. 6 when the strip copying device is properly attached to the casing 1. The resistance of the resistors 41, 42 is related to the size of the image on the copying paper placed onto the support.

In order to adjust the exposure controlling system for the selected format, when the latter is smaller than the area of the light permeable portion, the conductors of the potentiometers may be connected with specially provided fixed resistors or the apparatus may be provided with customary calibrating potentiometers which are used to account for sensitivity of the copying paper.

Figure 6:
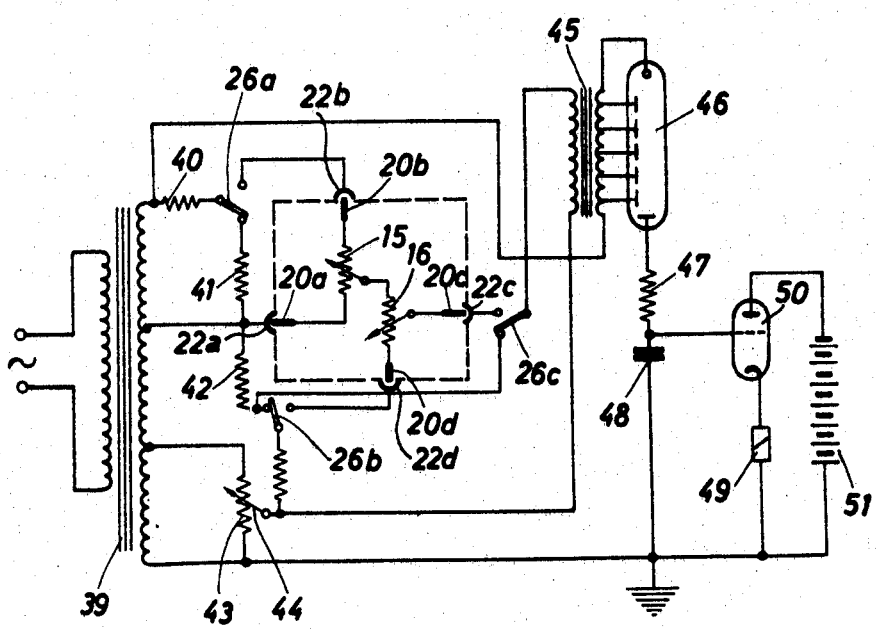
FIG. 6 is a diagram showing a portion of the electric control circuit which is accommodated in the casing.

Referring finally to FIG. 6, there is shown an electric circuit including a transformer 39 whose secondary winding is connected with fixed voltage dividing resistors 40, 41, 42 and with a variable resistor 43 which latter serves to regulate the exposure. The movable arm 44 of the resistor 43 is connected with the control element 6 of FIG. 1 and with the primary winding of a second transformer 45 which supplies current to a photomultiplier tube 46. The resistors 41, 42 are connected with the primary winding of the transformer 45 via switch contacts 26a, 26b. The contacts 26a, 26b are controlled by the plunger 24 shown in FIG. 4. The position of these contacts as shown in FIG. 6 corresponds to the position of the plug 20 and plunger 24 as shown in FIG. 4.

If the plug 20 is fully inserted into the socket 22, the cooperating terminals 20a–20d and 22a–22d of the plug 20 and socket 22 transmit current. The movable contacts 26a, 26b, 26c then leave the positions shown in FIG. 6 so that the potentiometers 15, 16 are connected in circuit by simultaneous disconnection of the fixed resistors 41, 42, i.e., the potentiometers are connected with the primary winding of the transformer 45. The movable arms of the potentiometers change their positions in response to shifting of the masks 17, 18 respectively.

The anode of the tube 46 is connected with one plate of a capacitor 48 through a resistor 47. The other plate of the capacitor 48 is grounded. A tap between the resistor 47 and capacitor 48 is connected with the grid of a thyratron tube 50 whose anode circuit includes a relay 49. The relay 49 actuates contacts which control various phases of the operation, such as terminating the exposure and others. For the sake of simplicity, the source 51 of electrical energy for the tube 50 is shown in the form of a battery.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In an apparatus for optical copying and enlarging of photographic negatives, a casing having a support for a sheet of light sensitive paper and provided with a light permeable portion arranged to admit into said casing light that passes through the paper; an image frame on said support, said image frame including shiftable masks for determining the size of the image of the projected negative on the paper, and adjustable potentiometers operatively connected with said masks for counterbalancing the effects due to changes in the quantity of light passing through the paper on shifting of said masks; and fastener means releasably securing said image frame to said casing so that, upon detachment of said image frame, a larger portion of said support is available for placing the paper thereon.

2. A structure as set forth in claim 1, wherein said fastener means comprises manually turnable screws which are rotatably mounted in said image frame, and wherein said support is provided with tapped bores arranged to receive said screws.

3. A structure as set forth in claim 1, wherein said masks are shiftable to and from predetermined starting positions, and further comprising blocking means connected with at least one of said masks and arranged to impede access to said fastener means when said one mask is moved from starting position.

4. A structure as set forth in claim 3, wherein said blocking means comprises a shield which overlies said fastener means on movement of said one mask from starting position.

5. A structure as set forth in claim 1, further comprising an electric control circuit provided in said casing, fixed resistor means in said casing, and switch-over means for automatically disconnecting said resistor means from said circuit in response to connection of said potentiometers, and vice versa.

6. A structure as set forth in claim 5, wherein the resistance of said resistor means equals the resistance offered by said potentiometers on shifting of said masks to positions in which the entire light permeable portion of said support is exposed.

7. A structure as set forth in claim 5, further comprising a plug member, a socket member, one of said members being conductively connected with said potentiometers and the other member being mounted on said casing and being connected in said circuit, said plug member being receivable in said socket member to thereby connect said potentiometers in said circuit, said resistor means being normally connected in said circuit and said switch-over means comprising a device arranged to disconnect said resistor means in response to insertion of said plug member into said socket member.

8. A structure as set forth in claim 7, wherein said other member is mounted on a part of said casing other than said support, and further comprising cable means connecting said one member with said potentiometers.

9. A structure as set forth in claim 1, further comprising at least one auxiliary unit arranged to be fastened to said casing upon disconnection of said image frame.

10. A structure as set forth in claim 9, wherein said auxiliary unit comprises a plug and said casing comprises a socket which is recessed into said support and receives said plug when the auxiliary unit is fastened to said casing.

11. A structure as set forth in claim 9, wherein said auxiliary unit includes a second image frame which is interchangeable with said first named image frame.

12. A structure as set forth in claim 11, wherein said second image frame is provided with shiftable masks but is free of potentiometers.

13. A structure as set forth in claim 12, wherein the masks of said second image frame are arranged to define an area which at least equals the area of said light permeable portion.

14. A structure as set forth in claim 9, wherein said auxiliary unit includes a second support whose area exceeds the area of said first named support, said second support having at least one light permeable portion overlying the light permeable portion of said first named support when the second support is fastened to said casing.

15. A structure as set forth in claim 14, wherein said casing has a side provided with at least one movable control element and wherein said second support comprises a portion extending beyond said side so as to obstruct access to said control element.

16. A structure as set forth in claim 15, further comprising remote control means provided on said second support and movable into motion transmitting engagement with said control element so that the latter may be moved through the intermediary of said remote control means.

17. A structure as set forth in claim 16, wherein said control element is rotatable with reference to said casing and wherein said remote control means comprises an axially movable rotary sleeve arranged to receive and to rotate said control element.

18. A structure as set forth in claim 9, wherein said auxiliary unit comprises a strip copying device arranged to be used interchangeably with said image frame, and further comprising an electric circuit in said casing, fixed resistor means in said casing, and means provided on said strip copying device for connecting said resistor means in said circuit in response to connect of said strip copying device to said casing, the resistance of said resistor means being related to the size of the image on the paper placed onto said support.

References Cited
UNITED STATES PATENTS
3,089,384   5/1963   Baasner _____ 88—24

NORTON ANSHER, *Primary Examiner.*
RICHARD A. WINTERCORN, *Assistant Examiner.*